INVENTORS
LOUIS BERTRAND
HARRY E. McCARTHY

BY *Fred E. Carlson*

ATTORNEY

United States Patent Office 3,462,086
Patented Aug. 19, 1969

3,462,086
FLUID ENERGY MILLING PROCESS
Louis Bertrand and Harry E. McCarthy, Newark, Del., assignors to E. I. du Pont de Nemours and Company, Wilmington, Del., a corporation of Delaware
Filed July 1, 1966, Ser. No. 562,322
Int. Cl. B02c 19/06, 21/00, 23/02
U.S. Cl. 241—5          6 Claims

ABSTRACT OF THE DISCLOSURE

A process is provided in which the inward radial velocity of the vortex relative to its angular velocity is such that $dDp/dr < 0$, where $Dp$ is the diameter of the equilibrium particle and $r$ is the corresponding vortex radius, to effect an inwardly increasing equilibrium particle size. This is accomplished by providing a critical degree of progressively inward decreased in the cross-section of the intermediate zone usch that $dh/dr$ is greater than the value of $$\left(\frac{h}{2C_{DP}} \times \frac{dC_{DP}}{dr}\right) - \left(\frac{\sqrt{V_r^2 + V_\theta^2}}{V_r} \times C_{DW}\right) - \left(\frac{h}{2\rho g} \times \frac{d\rho g}{dr}\right) + 2h$$

Figure 1:
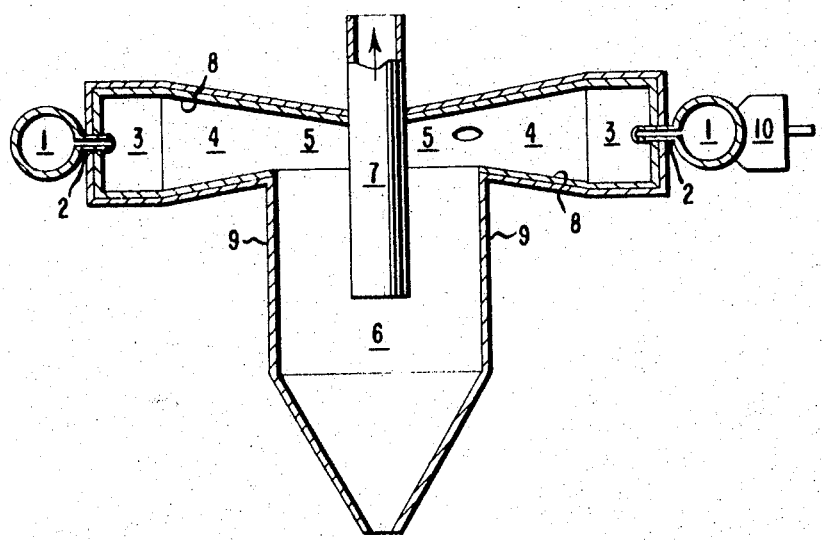

where:

$C_{DP}$ is the coefficient of particulate drag;
$V_r$ is the tangential velocity of the fluid;
$V_\theta$ is the radial velocity of the fluid;
$C_{DW}$ is the coefficient of wall drag; and
$\rho g$ is the fluid density.

---

This invention pertains to improved processes for the fluid energy milling of finely divided solids, particularly white pigments as titanum dioxide.

More specifically, the invention concerns improvements in methods of comminuting a pulverulent solid material wherein the material is subjected to fluid energy milling in a vortex which comprises (a) a peripheral milling zone, (b) an intermediate classifying zone and (c) a central discharge zone, all concentric and in sequential open communication, said improvements broadly comprising the steps of (1) providing a suspension of said material in a gaseous fluid medium at the periphery of said vortex, (2) establishing and maintaining said vortex in a high degree of symmetry especially in the classifying zone by injecting said medium and said suspension tangentially at the periphery of said vortex in a direction tangent to a circle of radius greater than that of the discharge zone, and preferably more than 85% of the vortex radius, (3) enclosing said vortex at least at the milling zone in a material at least one unit on the Moh Scale harder than the substance being ground, (4) controlling the inward radial velocity of said medium relative to its angular velocity between said milling zone and said discharge zone to effect inwardly increasing cut size for purticles of said material by providing at least a critical degree of progressively inward decrease in the paraxial cylindrical cross-section of said vortex between said milling and discharge zones, said critical decrease being such that the change of height with respect to radius of said cross section, $dh/dr$, is greater than the value of:

$$\left(\frac{h}{2C_{DP}} \cdot \frac{dC_{DP}}{dr}\right) - \left(\frac{\sqrt{V_r^2 + V_\theta^2}}{V_r} \cdot C_{DW}\right) - \left(\frac{h}{2\rho g} \cdot \frac{d\rho g}{dr}\right) + \frac{h}{2r}$$

where:

$h$ is the paraxial height of the vortex at radius $r$
$C_{DP}$ is the coefficient of particulate drag
$V_r$ is the radial inward velocity of the fluid
$V_\theta$ is the tangential vortex velocity
$C_{DW}$ is the wall coefficient of drag
$\rho g$ is the fluid density, and (5) discharging all of said material centrally from said vortex.

Figure 2:
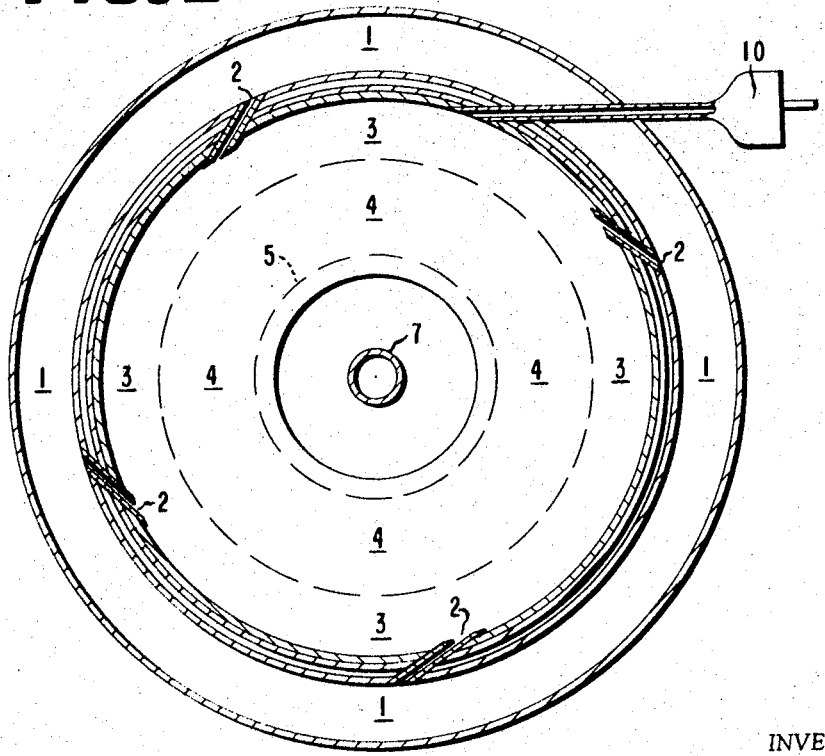

In the drawings:

FIGURE 1 is a schematic drawing of a cross section of a fluid energy mill suitable for use in carrying out a process of the invention, and FIGURE 2 is a cross section of the same mill taken normal to FIGURE 1.

BACKGROUND OF THE INVENTION

Fluid energy mills of the vortex type are well known in the art, being described, for instance, in considerable detail in U.S. Patent 2,032,827. They generally comprise a disc-shaped zone wherein the inward circular or spiral flow of the gaseous fluid causes attrition of the particles at the periphery and provides a size separation in the intermediate zone. The device combines the function of grinding and classification within a single chamber. Since the fluid is fed into the periphery and discharged at the axis of the vortex there is a tendency for particles to be swept toward the central outlet in a spiral path. The force due to drag of the fluid acting on the suspended particle is opposed by the centrifugal force. This balance of forces can be so adjusted that coarse particles tend to return to or be held at the periphery for more attrition while smaller particles are swept to the center for collection in a cyclone and/or filters. In these devices the energy for comminution is supplied in a gaseous fluid medium injected tangentially into the vortex chamber to create and maintain the vortex. Steam under pressure, superheated if desired, is frequently used for this purpose where the materials involved are not degraded by contact with steam. Other vapors or gases may be selected for for use primarily on the basis of compatibility with the material being processed. In a recent improvement, described in U.S. Patent 3,178,121 and France No. 1,431,- 239, the fluid is injected at supersonic velocity to increase the available kinetic energy.

Such fluid energy mills are well adapted to fine grinding. In cases where the single particles of the powder are quite frangible the particles may be broken in the attrition or milling zone. There are many substances of mineral crystalline character, the single particles of which are not usually comminuted by fluid energy mills. Almost all of these substances in powder form, however, contain aggregates or accretions of fine particles which must be separated in order to attain the desired fine-textured product. Mineral pigments and cosmetic powders are in this class. Titanium dioxide, in both the anatase and rutile forms, contains such undesired aggregates as the product emerges from the high temperature treatments employed during its manufacture. The outstanding light scattering power of this white pigment reaches a maximum when all its particles are in the range of from .2 to .25 micron in diameter. If, however, some of these particles are in the form of aggregates, in effect making particles of larger size, the scattering efficiency of the pigment and hence its inherent useful hiding power and opacity are accordingly impaired. Furthermore, the agglomerates destroy the fine texture of such pigments as evidenced in examining the gloss of a paint prepared from them. Sometimes quite vigorous grinding is required to break up these agglomerates and a further problem of discoloration of such white pigments due to abrasion of the grinding medium and the mill itself arises. It is quite evident that the texture improvement obtained in vortex mills is due to the combined grinding and classifying action.

DESCRIPTION OF THE INVENTION

The present invention provides improvements which are especially advantageous in dispersing pigment aggregates and producing fine textured powders while avoiding discoloring contamination. While the invention concerns the use of certain critical conditions in a vortex mill which can be obtained in devices of this type having a variety of shapes and sizes, the improvements can be illustrated by reference to the specific device shown in the drawings. The drawings are schematic and not drawn to scale. FIGURE 1 shows a cross section including the axis of a mill. 1 is a circular pipe ringing the vortex chamber which distributes the fluid through tangential jets at 2 to the attrition or grinding zone 3 of the vortex. The intermediate or classifying zone 4 is seen to decrease in height as the axis is approached. The discharge zone 5 opens into a cyclone separator 6 from which the spent fluid exits through pipe 7 usually to filters which recover entrained fine particles. The vortex is enclosed in a hard substance 8 mounted as a liner in the steel case 9.

FIGURE 2 shows a cross sectional normal to the axis at the level of the inlet jets 2. The numerals through 9 have the same significance as in FIG. 1. At least one injector 10 for tangentially introducing the pulverulent feed into the attrition zone 3 is provided. A venturi-feeder is represented by 10 and is preferred, but other types, such as mechanical screw feeders, can be employed. As indicated, the solids are fed through the injector through the steam header 1 in order to deliver the feed tangentially and approximately parallel to the sides of the vortex in the attrition zone 3.

This invention is concerned with the conditions prevailing broadly in the vortex indicated by 3 and 4 and 5, but more particularly with the conditions in the intermediate zone 4. As previously stated, the intermediate or classifying zone 4 is made to converge with decreasing radius of the vortex. The amount of convergence is critical in order that the equilibrium particle size (cut size) shall increase inwardly along the radius. The equilibrium particle size is that size of particle which for a given material and a given fluid becomes, at some radial distance in the vortex, acted upon equally by the centrifugal force and the fluid drag. In a perfect vortex particles of this size tend to accumulate at the equilibrium distance from the center. In the prior art mills the vortex is formed between more or less parallel or diverging surfaces. In these vortices the equilibrium size decreases inwardly along the radius. This heretofore was thought necessary to insure that the coarse fraction would be thoroughly removed toward the perimeter.

According to this invention, a very different condition of particle size balance is achieved. There is established an equilibrium point, or "cut point" for a selected size of particle at some specific radial distance. Particles just under the critical size are swept rapidly to the discharge from this equilibrium zone. Large particles are forced outward. The equlibrium zone under ideal conditions is a thin, hollow cylinder having the equilibrium radius and a height equal to the vortex thickness at that radial distance. As a result of this condition, accumulation of equilibrium particles can occur only in this extremely thin equilibrium zone. It is, however, so thin that it is in practice unstable as to exact location and small amplitude changes cause the equilibrium particles to escape either toward the center or back to the milling zone for further comminution. Thus, eventually, all particles are reduced to the equilibrium size or under and passed to the outlet. As previously stated, this condition is obtained by a vortex having an inward convergence greater than a critical value—depending on the chamber height and radius at the periphery of the classification zone, the nature of the particulate matter, the properties of the fluid medium, the flow rates, and the tangential velocity. This convergence can be determined by experimental trial for a given substance and fluid. The essential criteria for the condition may, however, be stated in more precise detail by the following expression of inequality in which the vortex is assumed to be symmetrical and the convergence is measured by the vortex (or chamber) height ($h$) at a given radius. This relationship is applied to the intermediate zone. As previously stated, the zones of the vortex are in open communication and therefore the converging surfaces of the vortex may not intersect. Conical surfaces are most practical but converging surfaces of rotation of curved lines may also be used if they preserve the required conditions of convergence.

From the foregoing broad statement of the invention it follows that the vortex is shaped so that the gradient of equilibrium particle size to vortex radius (now measured from the center) is negative:

(1) $$dDp/dr < 0$$

where $Dp$ is the diameter of the particle and $r$ the corresponding vortex radius. For compressible flow and allowing for fluid friction at the converging vortex chamber walls, this criterion implies the following specification on the vortex height gradient:

$$\frac{dh}{dr} > \left(\frac{h}{2C_{DP}} \cdot \frac{dC_{DP}}{dr}\right) - \left(\frac{\sqrt{V_r^2 + V_\theta^2}}{V_r} \cdot C_{DW}\right) - \left(\frac{h}{2\rho g} \cdot \frac{d\rho g}{dr}\right) + 2r$$

where:

$h$ is the paraxial height of the vortex at any radius $r$,
$C_{DP}$ is the coefficient of particulate drag,
$V_r$ is the radial inward velocity of the fluid,
$V_\theta$ is the tangential vortex velocity,
$C_{DW}$ is the wall coefficient of drag, and
$\rho g$ is the fluid density.

It is preferred that $dh/dr < 2$, and that the paraxial height of the vortex at the periphery of the converging zone be not greater than the radius at that point. Having established the vortex convergence within the above limit, the operating adjustment to make a given size separation is made by regulating the fluid flow and changing the tangential velocity of the fluid. The former involves changing the amount of fluid used per unit time for a given vortex. The latter may be further controlled by using nozzles of varying tangency and dynamic design. The higher the tangential velocity the smaller the cut size.

Since most of the particles handled in the vortex mill are small enough to come within the scope of Stokes' law when $$C_{DP} = \frac{24\mu}{D_P V_r \rho g}$$

the specification as to the convergence can be simplified and limited for most uses to the expression:

$$2 > \frac{dh}{dr} > \frac{2h}{r} - \frac{2\sqrt{V_r + V_\theta^2}}{V_r^2} \cdot C_{DW} - \frac{h}{\rho g} \cdot \frac{d\rho g}{dr}$$

This should also be limited by the condition that the vortex height is no greater than the radius at the periphery of the intermediate zone. $dh/dr$ may vary along the radius so long as it comes within the value specified above.

Certain ancillary features working in cooperation with the convergence are preferred modifications of this invention. The tangency of the fluid jets is preferably kept near the outer extreme in order to maintain the desired high symmetry of vortex. Good symmetry is obtained when all jets are mounted and shaped to be flush with the circular wall of the vortex chamber and kept tangent to a circle of radius greater than the radius of the central discharge zone. Converging-diverging jet nozzles capable of injecting the fluid at supersonic speeds are preferred. These not only tend to increase the tangential velocity but apparently provide considerable additional grinding in the highly turbulent zone of free expansion just inside the peripheral wall. With abrasive materials, even titanium dioxide pigment, there is considerable abrasion of the chamber wall at this point leading to discoloration of white products. To overcome this, the tangency may be set below about 95% of the maximum and an abrasion resistant liner for the chamber may be provided. Substances with a hardness of 8 or more on the Moh Scale are frequently beneficial in preserving the whiteness of pigments. In general, the liner should be at least one point on the Moh Scale harder than the material being ground. The various hard carbides, nitrides, borides, etc. are applicable. Materials made from "hard metal" powders and sintered with or without bonding agents may be used as may hard fired alumina, mullite and the spinels. Usually, the inner surfaces of these materials which control the shape of the vortex should be smooth. A smooth surface is not essential however. Furthermore, circular or spiral grooves may be formed in them to stabilize the vortex if desired. In determining the converging characteristics, the slope of the gross surface rather than the fine structure is of course the characteristic feature in the inventive concept.

Example 1

An 18" diameter fluid energy mill, of the design shown in the drawings and constructed of steel, wherein the height of the vortex at the periphery of the converging zone 4 was ¾" and the height at the inner radius of zone 4 was 0.15 inch, was used. The radius of the discharge zone 5 was 6 inches while the outer radius of the converging zone 4 was 8 inches leaving a 1 inch peripheral grinding zone into which the eight nozzles, set with their axis tangent to an 8" radius circle, injected steam supplied at the ring header at 550° F. and 110 p.s.i.g. In this mill provision was made to insert small Pitot tubes to determine the fluid velocity at the perimeter of the converging zone. A calcined rutile titanium dioxide pigment was fed to the periphery through a venturi at 100#/hr. while the total steam flow was 580#/hr. The tangential velocity at the 8 inch radial point was measured at 812 ft./sec. and from the vortex size and volume of steam flowing the inward radial velocity was calculated to be 21.7 ft./sec. With this information it was calculated by applying known laws of fluid mechanics that the equilibrium size at the 8 inch radius circle was 1.3 microns diameter. This calculation assumed a full theoretical density for the rutile particles. It was realized that the density of the aggregates, which were being disintegrated, was lower and that correspondingly larger particles would travel to the center and be collected with the product.

Similarly, the cut size at the six inch radius was calculated to be 2.4 microns from the measured values, $V_\theta=803$ ft./sec. and $V_r=95.1$ ft./sec. Since the convergence is linear in this case, the cut size progressively increased from the 8" to the 6" radial distances, fulfilling the criterion of the invention that $dDp/dr<0$. These cut sizes are an order of magnitude larger than the average primary particle, but such separation is satisfactory for removal of the aggregates which degrade gloss.

The particles passing through the vortex in this example are all in the size range obeying Stokes' law. The operation therefore should be within the scope of the third (3) of the previously stated inequalities. This can be shown by calculating the lower limit of convergence set by (3), from the measured and calculated values of the variable involved, at both the 8" and 6" radii which enclose the classifying or converging zone. The value of these variables are as follows:

|  | 8" radius | 6" radius |
|---|---|---|
| $V_\theta$, ft./sec | 812 | 803 |
| $V_r$, ft./sec | 21.7 | 95.1 |
| $C_{DW}$ | .0035 | .00478 |
| $\rho g$ | .0284 | .0259 |
| $d\rho g/dr$ | −.016 | −.0167 |

By substituting these values in the inequality (3), one obtains:

| | | |
|---|---|---|
| dh/dr | −.043 | −.0234 |

The actual geometric convergence of the classifying zone used was .75–15/2, or .3. Therefore, the convergence used was greater than the limits set by the applicable inequality and the improvement obtained resulted from operating according to the invention as set forth in the third (3) inequality. After one hour of operation at the 100#/hr. pigment rate, this feed rate was doubled. The resulting measured tangential velocity was 656 ft./sec., the radial velocity 30.1 ft./sec. and the calculated equilibrium particle size 1.9 microns.

Significant particle size measurements are difficult to make in this range so a more practical method of evaluating the mill action was used, namely, measurement of gloss of an enamel paint prepared from the milled product. Products from these two conditions were compared with the same feed material ground at the same flow rates in a conventional "micronizer" of the same diameter having parallel vortex surfaces. The results are shown in Table I. It is evident from this experiment that the new method provides both improved milling and higher capacity. However, due to the more complete grinding some loss of whiteness occurs because of abrasion of the steel.

TABLE I

|  | Conventional Mill | | Improved Mill | |
|---|---|---|---|---|
|  | 100#/hr. | 200#/hr. | 100#/hr. | 200#/hr. |
| Gloss | 55 | Poor | 64 | 56 |
| Whiteness | 20 | 21 | 18 | 19 |

*The gloss test.*—"Gloss" is a term used to describe the optical smoothness of a reflecting surface such as that of an enamel paint. The gloss of a paint surface is affected by coarse particles in a pigment used. The quality of a pigment, in this respect, is best observed by actually preparing the paints under standardized conditions and optically examining the surface. The products of the example and the control were incorporated in a gloss sensitive, alkyd-amino resin vehicle (Ford M30-J automotive baking enamel) and thinned with volatile solvent to spraying consistency and sprayed onto panels. After drying and baking, the panels were compared in standardized gloss meter. In the gloss meter a focused light beam was directed onto the enamel surface at a 20 degree incident angle. A photoelectric meter was placed to intercept the reflected beam and measure its intensity. Higher readings on the meter indicated the better gloss since surface imperfections cause diffused reflection which does not reach the photometer. The gloss meter was standardized with respect to the intensity of incident light and the portion of reflected light reaching the photocell, against a glass plate corresponding to a value on an arbitrary gloss scale. The experimental samples and controls may thus be compared and given a significant numerical relative gloss rating.

*The whiteness test.*—This is a method of visually evaluating the relative brightness of white pigments. The samples are graded by being placed side by side with a standard pigment of an arbitrarily assigned brightness number. A series of these standards is set up according to a scale of brightness numbers, the higher the number the brighter the standard. A difference of one point is about the least discernible difference to a trained eye. In this case the final standard used for comparison was rated at 18:2y. The y values indicate degrees of yellowness which is very slight yellow cast usually found in rutile $TiO_2$ pigments. A description of this test by J. E. Booge and H. E. Eastlack is found in the Paint, Oil and Chemical Review, Apr. 9, 1924.

Example 2

A mill similar to the one described in Example 1 except that the outer attrition zone and the converging zone was lined with silicon carbide granules bonded with fused silicon nitride and the vortex chamber, 26 inches in inside diameter, was constructed having steam nozzles set tangent to a 23 inch circle, and the classifying zone had a dual convergence, h being 3⅜" at the 13" radius, 3" at the 11" radius, and 2¼" at the 9" radius. A rutile titanium dioxide pigment made by the vapor phase oxidation of $TiCl_4$, and subsequently having wet-precipitated thereon minor amounts of silica and alumina, was dried and fed to both the above mill and a conventional mill, the latter being 36 inches in diameter with a flat vortex. This mill was lined with hard, white ceramic. Table II gives data on the performance of the two.

TABLE II

|  | Conventional mill | Improved mill | |
|---|---|---|---|
| # TiO₂ fed/hr | 2,250 | 4,350 | 6,150 |
| # Steam/hr | 10,000 | 12,600 | 12,600 |
| Steam/pigment | 4.5 | 2.9 | 2.1 |
| Whiteness | 21:3y | 21:3y | 21:3y |
| Gloss | 74 | 72 | 67 |

From the above, it is seen that with hard lining no loss in whiteness is suffered. The test shows primarily the capacity advantage under conditions of the invention, the improved method being capable of producing substantially equal gloss properties at double or more the production rate of a larger conventional mill and at the same time showing steam economy relative to the pigment processed.

Other advantages are realized as a result of using the fluid energy milling conditions of this invention. The better separation of the primary TiO₂ particles, for example, frequently yields a hiding power increase of the order of 5% or more. Another desirable property of a pigment is its ready dispersibility in, for example, water emulsion paint systems. Absence of flocs in the titanium dioxide pigment treated by this invention is often observed and, although the phenomenon is not well explained, it is thought to be due to the lower steam/pigment ratio possible at high production rates. A particularly advantageous pigment is obtained when titanium dioxide is processed while maintaining the equilibrium particle size at the periphery of the classifying zone in the range of 1 to 3 microns in diameter.

The overall superior performance of fluid milling in a vortex having at least a critical convergence is believed due to the fact that there is no substantial accumulation of equilibrium particles in the vortex. It has been found that previous vortex mills do accumulate particles in this manner and periodically become choked causing irregular discharge of coarse or unclassified particles into the product.

We claim:
1. In a process for comminuting a pulverulent solid material wherein said material is subjected to gaseous fluid energy milling in a vortex, said vortex comprising a peripheral milling zone, an intermediate classifying zone and a central discharge zone, the improvement which comprises controlling the inward radial velocity of the fluid relative to its angular velocity between said milling zone and said discharge zone such that $dDp/dr<0$, where $Dp$ is the diameter of the equilibrium particle and $r$ is the corresponding vortex radius, to effect an inwardly increasing equilibrium particle size, said controlling being accomplished by providing at least a critical degree of progressively inward decrease in the paraxial cylindrical cross-section of said intermediate zone, said critical decrease being such that the change of height with respect to radius of said cross section, $dh/dr$, is greater than the value of:

$$\left(\frac{h}{2C_{DP}} \cdot \frac{dC_{DP}}{dr}\right) - \left(\frac{\sqrt{V_r^2+V_\theta^2}}{V_r} \cdot C_{DW}\right) \cdot \left(\frac{h}{2\rho g} \cdot \frac{d\rho g}{dr}\right) + \frac{h}{2r}$$

where:
$h$ is the paraxial height of the vortex at radius $r$
$C_{DP}$ is the coefficient of particulate drag
$V_r$ is the radial inward velocity of the fluid
$V_\theta$ is the tangential vortex velocity
$C_{DW}$ is the wall coefficient of drag
$\rho g$ is the fluid density 2. A process of claim 1 wherein $dh/dr$ is less than 2.
3. A process of claim 1 in which the pulverulent solid material is a white pigment, and the vortex is enclosed, at least at the milling zone, in a material at least one unit on the Moh Scale harder than said solid material.
4. A process of claim 3 in which the pulverulent solid material is titanium dioxide.
5. A process of claim 1 in which the equilibrium particle size at the periphery of the classifying zone is in the range from 1 to 3 microns in diameter.
6. A process for comminuting a pulverulent solid material comprising: subjecting said material to gaseous fluid energy milling in a vortex, said vortex having a peripheral milling zone, an intermediate classifying zone, and a central discharge zone, and controlling the inward radial velocity of a fluid used in said vortex relative to its angular velocity between said milling zone and said discharge zone such that $dDp/dr<0$ where $Dp$ is the diameter of the equilibrium particle and $r$ is the corresponding vortex radius, to effect an inwardly increasing equilibrium particle size.

References Cited

UNITED STATES PATENTS

| 2,588,945 | 3/1952 | Trost | 241—5 X |
| 3,178,121 | 4/1965 | Wallace | 241—5 |
| 3,223,333 | 12/1965 | Stephanoff | 241—5 |

WILLIAM S. LAWSON, Primary Examiner

U.S. Cl. X.R.
241—19, 23, 39